United States Patent
Iwanaga et al.

(10) Patent No.: US 9,684,454 B2
(45) Date of Patent: Jun. 20, 2017

(54) METHOD, STORAGE SYSTEM, AND PROGRAM FOR SPANNING SINGLE FILE ACROSS PLURALITY OF TAPE MEDIA

(71) Applicant: International Business Machines Corporation, Armonk, NY (US)

(72) Inventors: Masayuki Iwanaga, Tokyo (JP); Yumiko Ohta, Tokyo (JP); Yutaka Oishi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 14/456,316

(22) Filed: Aug. 11, 2014

(65) Prior Publication Data
US 2015/0046645 A1 Feb. 12, 2015

(30) Foreign Application Priority Data
Aug. 12, 2013 (JP) .................................. 2013-167682

(51) Int. Cl.
G06F 3/06 (2006.01)
G06F 17/30 (2006.01)

(52) U.S. Cl.
CPC ............ *G06F 3/061* (2013.01); *G06F 3/0643* (2013.01); *G06F 3/0682* (2013.01); *G06F 17/30* (2013.01)

(58) Field of Classification Search
CPC ..................................................... G06F 17/30
See application file for complete search history.

(56) References Cited

U.S. PATENT DOCUMENTS

| | | | | |
|---|---|---|---|---|
| 2002/0191311 | A1* | 12/2002 | Ulrich | G06F 17/30067 360/1 |
| 2004/0098547 | A1* | 5/2004 | Ofek | G06F 11/1451 711/162 |
| 2011/0238716 | A1 | 9/2011 | Amir et al. | |
| 2013/0103708 | A1* | 4/2013 | Kim | G06F 17/30203 707/758 |

(Continued)

FOREIGN PATENT DOCUMENTS

| | | |
|---|---|---|
| JP | H05342073 A | 12/1993 |
| JP | H0969028 A | 3/1997 |

(Continued)

*Primary Examiner* — Charles Rones
*Assistant Examiner* — Tian-Pong Chang
(74) *Attorney, Agent, or Firm* — Stephen J. Walder, Jr.; Randall J. Bluestone

(57) ABSTRACT

Mechanisms for splitting and spanning a single file across a plurality of tape media in a tape drive file system are provided. The mechanisms format the tape media so as to store an index of the file and data on the file in the tape media in a predetermined format; splitting the single file into separate portions and managing at least one of IDs identifying the plurality of tape media that sequentially store the portions of the file in association with the file; and storing a generation number indicating the number of storing and updating each of the file portions as the index in each of the tape media. Upon receiving a request to read the stored split file, the system obtains an index on a tape medium storing a file portion whose generation number is the highest and reads a time stamp related to the size and update of the single file.

18 Claims, 6 Drawing Sheets

(56) References Cited

U.S. PATENT DOCUMENTS

| | | | | |
|---|---|---|---|---|
| 2013/0212342 A1* | 8/2013 | McCullough | .... | G11B 20/10527 711/156 |
| 2013/0265669 A1* | 10/2013 | Hostetter | ........... | G11B 5/00813 360/60 |
| 2014/0244607 A1* | 8/2014 | Hedinsson | ........ | G06F 17/30053 707/705 |

FOREIGN PATENT DOCUMENTS

| JP | H10232800 A | 9/1998 |
|---|---|---|
| JP | 11-306190 A | 11/1999 |

\* cited by examiner

FIG. 2
SPANNING OF SINGLE FILE ACROSS PLURALITY OF MEDIA
REGISTERING METADATA ON INDIVIDUAL FILES WITH INDEX PARTITIONS
(a) KNOWN IDEA
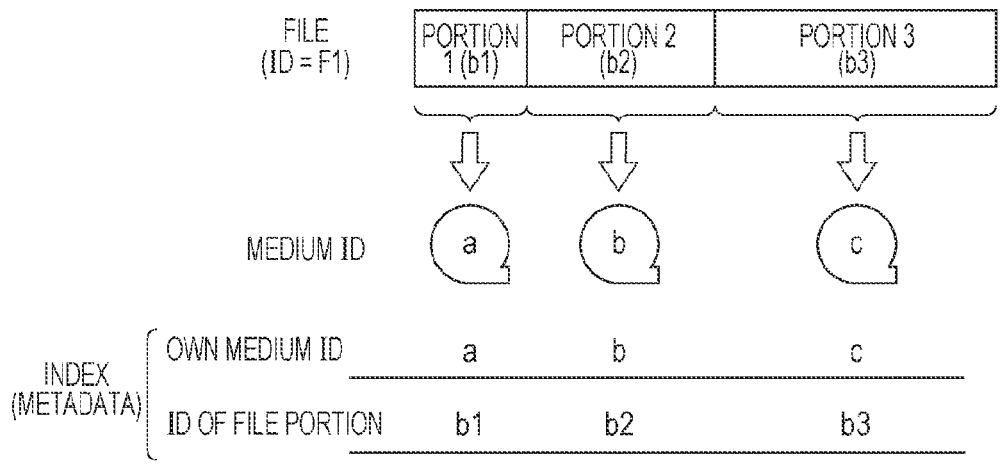
(b) IDEA OF PRESENT INVENTION
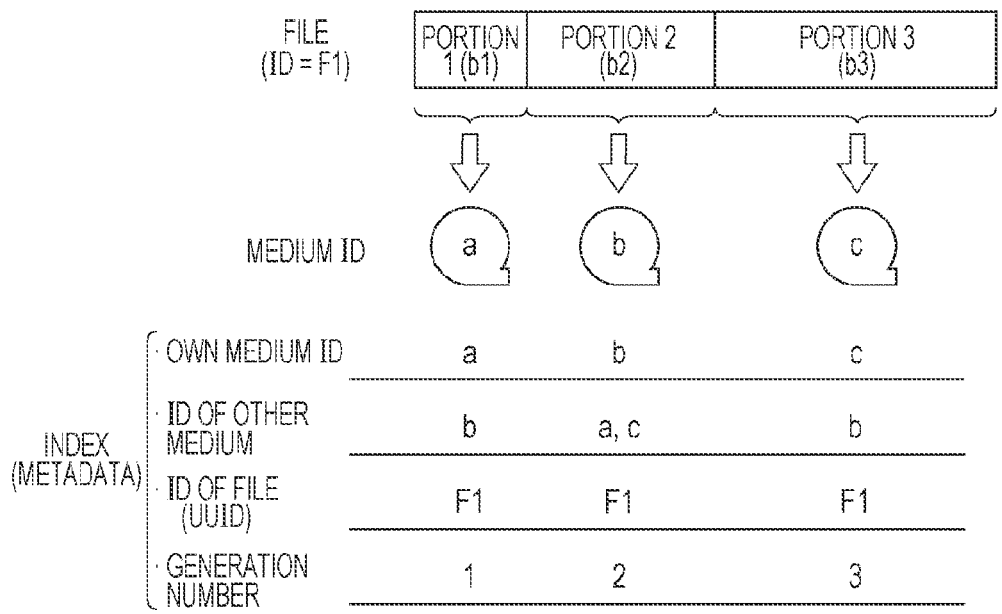
NOTE:
- FILE (F1) = PORTION (b1) + PORTION (b2) + PORTION (b3)
- LIBRARY MANAGER CAN IDENTIFY MEDIA USING INFORMATION ON MEDIA ID (a, b, c)

FIG. 3

LTFS FORMAT AND CHANGING (ADDING AND UPDATING) OF FILE (A) INFORMATION WRITTEN TO TAPE IMMEDIATELY AFTER INITIALIZED IN LTFS FORMAT

IP: | FID | VOL1 Label | FM | LTFS Label | FM | Index #0 | FM |

DP: | FID | VOL1 Label | FM | LTFS Label | FM | Index #0 | FM |

(B) INFORMATION WRITTEN TO TAPE IN THE CASE WHERE File 1 IS WRITTEN AFTER STATE OF (A)

IP: | FID | VOL1 Label | FM | LTFS Label | FM | Index #1 | FM |

DP: | FID | VOL1 Label | FM | LTFS Label | FM | Index #0 | FM | File 1 | FM | Index #1 | FM |

(C) INFORMATION WRITTEN TO TAPE IN THE CASE WHERE FILE (File 2) IS WRITTEN AFTER STATE OF (B)

IP: | FID | VOL1 Label | FM | LTFS Label | FM | Index #2 | FM |

DP: | FID | VOL1 Label | FM | LTFS Label | FM | Index #0 | FM | File 1 | FM | File 2 | FM | Index #2 | FM |

METHOD, STORAGE SYSTEM, AND PROGRAM FOR SPANNING SINGLE FILE ACROSS PLURALITY OF TAPE MEDIA

BACKGROUND

The present invention relates to a method for splitting a single file and storing the file in a plurality of tape media, i.e. spanning in a tape drive file system.

Methods exist for using a tape medium (e.g., a tape cartridge or other tape medium) via a file system as if the tape medium is a hard disk drive (HDD) or a Universal Serial Bus (USB) memory. For example, a linear tape file system (LTFS) manages a tape medium split into two areas called a data partition (DP) and an index partition (IP). The LTFS stores the main body of a file in the DP of a tape medium and also stores metadata corresponding to the file, called an index, such as a file name or an ID for identifying the file, in the IP of the tape medium in an extensible markup language (XML) file format. The index includes metadata on all of the files stored in a single tape medium. The present LTFS format does not allow splitting a single file and storing it in a plurality of tape media.

For example, a fifth-generation linear tape open (LTO) tape drive does not allow writing data exceeding a maximum capacity of 1.5 TB on a single tape medium. Furthermore, in the case where additional data is to be written into a tape medium in which a certain amount of data is already written, only data having a capacity smaller than the maximum capacity of the tape medium can be added. Data exceeding the capacity of the maximum capacity of the tape medium (e.g., 1.5 TB) cannot be split and stored on a second tape medium.

Furthermore, the volume of a file to be written sometimes has not been determined at the start of writing. Examples include a case where recording for producing a program in a broadcasting industry or the like is performed in real time, and a case where an image taken by a USB camera is continuously directly written to a tape medium in a security system. In such cases, the volume of the file being written to the tape medium sometimes exceeds the capacity of the tape medium. This requires splitting the written file and storing it and continuing to write the following data into another medium (spanning).

In the case where the spanned file is changed (for example, data is added or partially deleted or the file name is changed), index information on all the tape media that store portions of the file (file size, time stamp, file name, and so on) needs to be updated. The LTFS holds a copy of an index recorded on a tape medium in a memory or a hard disk drive. This is because it takes much time to read the index from the tape medium when the tape medium is mounted in a tape drive. If the copy has the same information as the index on the tape medium, the index on the tape medium is not used. In other words, the LTFS reads the index information on the tape medium in the case where the copy of the index in the memory or the hard disk drive cannot be used for some reason.

In the case where only the index of part of the tape media in which a spanned file is stored is updated, a problem occurs. The LTFS cannot determine index information for which of the tape media should be adopted when reading an index on a tape medium. Also for a change in a file portion, index information on all the tape media that store the spanned file needs to be updated.

To change a tape medium mounted in a tape drive system by using a tape library, it takes two minutes on average, or sometimes even four minutes or more. Even if the file main body is recorded on a tape medium, a problem may occur in the event of a trouble event, such as a power-down of the tape drive before the index is updated. The LTFS cannot use a file main body that is not registered in the index. Therefore, in a standard setting, the index is updated every five minutes during writing of the file main body.

Japanese Unexamined Patent Application Publication No. 11-306190 discloses a technique for relocating system information in a single medium to distribute and store system information necessary for file management in a plurality of media. However, this technique does not show which information on the media the metadata of a single file represents if the file cannot be stored in a single medium. In the known LTFS, changing a tape medium mounted in a tape drive at certain intervals when splitting a file into a plurality of cartridges is impractical from the viewpoint of performance, i.e. with regard to the time necessary for writing data to the tape media.

SUMMARY

Accordingly, an object of the present invention is to provide a method having a spanning function for splitting a single file and storing the file in a plurality of tape media in a Linear Tape File System (LTFS).

To achieve the object, a method according to a first aspect of the present invention is a method for splitting a single file and storing the file in a plurality of tape media (spanning) in a tape storage system including at least one tape drive. This method includes the operations of formatting the tape media so as to store an index (metadata) of the file and data of the file in the tape media in a predetermined format; splitting the single file into separate portions and managing IDs identifying the plurality of tape media that sequentially store the portions of the file (file portions) in association with the file; and storing a generation number indicating the number of storing and updating each of the file portions as the index in each of the tape media. Upon receiving a request to read the stored split file, the system obtains an index on a tape medium storing a file portion whose generation number is the highest and reads the metadata of the file.

In the predetermined format of the spanning method, the tape media are each divided into two or more partitions to allow the file system to read and write for sequential access of the storage system. The partitions include an index partition (IP) storing the index of the file and a data partition (DP) storing data on the file. In the spanning method, the generation numbers to be stored in the individual tape media store are values increased by one every time the single file is split and written to the following tape medium.

In the spanning method, when one of the file portions is changed, the maximum value of the generation number, which is the history of changes in the file portion, is updated by increasing the value by one, and is stored in the tape medium. In the spanning method, an ID identifying the file is stored as the index in each of the tape media that store the file portions, and the indices stored in the plurality of tape media storing the file portions each indicates a portion of the single file in association with the ID of the file. In the spanning method, the tape media that store the portions of the single file each store, as the index, at least one of the IDs identifying the plurality of tape media that store the other portions of the file in association with the file.

In the spanning method, a tape medium storing a first file portion further stores, as the index, the ID of a tape medium that stores a file portion preceding the first file portion (preceding medium ID) and the ID of a tape medium that stores a file portion following the first file portion (following medium ID). In the spanning method, when the tape storage system receives a request to change one of the file portions (to add data, to partially change the data, or to change the file name), the system identifies the ID of a tape medium storing the file portion to be updated and mounts the tape medium in a drive, copies the index on the tape medium having the ID into a memory or a hard disk of the system, changes the data in the DP of the tape medium on the basis of the change in the file portion, changes the index on the memory as the data in the DP changes so as to reflect the details of the change in the file portion, causes the changed index in the memory to include the generation number of the file portion at the point of the change, and registers the index in the IP of the tape medium at a predetermined time (every five minutes in a mounted state or in an unmounted state).

To achieve the object, a tape storage system according to a second aspect of the present invention is a system including at least one tape drive, for splitting a single file and storing the file in a plurality of tape media (spanning). The reading and writing control of the system includes the operations of formatting the tape media so as to store an index (metadata) of the file and data of the file in the tape media in a predetermined format; splitting the single file into separate portions and managing IDs identifying the plurality of tape media that sequentially store the portions of the file (file portions) in association with the file; and storing a generation number indicating the number of storing and updating each of the file portions as the index in each of the tape media. Upon receiving a request to read the stored split file, the system obtains an index on a tape medium storing a file portion whose generation number is the highest and reads the metadata of the file.

To achieve the object, a program product according to a third aspect of the present invention is a program product for splitting a single file and storing the file in a plurality of tape media (spanning) in a tape storage system including at least one tape drive. The program product causes the system to execute the operations of formatting the tape media so as to store an index (metadata) of the file and data of the file in the tape media in a predetermined format; splitting the single file into separate portions and managing IDs identifying the plurality of tape media that sequentially store the portions of the file (file portions) in association with the file; and storing a generation number indicating the number of storing and updating each of the file portions as the index in each of the tape media. The system according to an aspect of the present invention can obtain the latest index from a single tape medium without updating the indices of all the tape media when updating a spanned file.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 2 illustrates an example operation for registering the metadata of the individual media in an index partition when spanning a single file across a plurality of media;

FIG. 3 illustrates an example of the contents of an index partition and a data partition of a medium in an LTFS format;

DETAILED DESCRIPTION

An embodiment of the present invention for writing, reading, and editing of data of a plurality of portions of a single file in a tape library system will be described herein below. The present invention relates to addition of a new element to the index in the Index Partition (IP) of an Linear Tape File System (LTFS). In supporting spanning in the LTFS, the following information is stored in the index for each of files.

The ID of the file, for example, a universally unique identifier (UUID) is stored. Tape media each manage a plurality of files stored therein with IDs. A new ID that indicates a file spanned across a plurality of tape media is provided.

The IDs of preceding and following tape media (for example, barcode labels) are stored. Tape media each store a tape medium ID thereof in its index and the IDs of the other media to associate therewith. The other media are each provided with the IDs of the preceding and following media, which store the other portions of the file in sequence, in association with the medium so that the preceding and following media can be designated.

A generation number is stored. The generation number is the number indicating a changed file portion in an index for the file. Every time a plurality of portions of a single file are each stored in the following medium, a value stored in each medium is increased by one from the preceding value and is stored in the medium. If a change request is issued from an application 30 (FIG. 5) to a specific file portion, all the generation numbers stored in all the spanned media can be obtained. The maximum value of all of the generation numbers is increased by one and is stored as the generation number of a medium including the changed file portion. By referring to the generation number, the LTFS can obtain the latest information from a single tape medium without updating the indices of all the tape media when creating/updating the spanned files. Specifically, when reading indices from tape media, the LTFS collects the indices of all the tape media in the tape library and adopts information with the highest generation number of each of the files, thereby obtaining information on the file size and time stamp. Furthermore, by following the registered IDs of the preceding and following tape media, the LTFS can be informed of which part of which tape media the portions of the files are stored in. For example, the application 30 can obtain generation numbers included in the indices of the individual media at the timing when the file is opened by designating a path including a medium having the beginning of the file and following the first medium and the following media in sequence.

Figure 1:
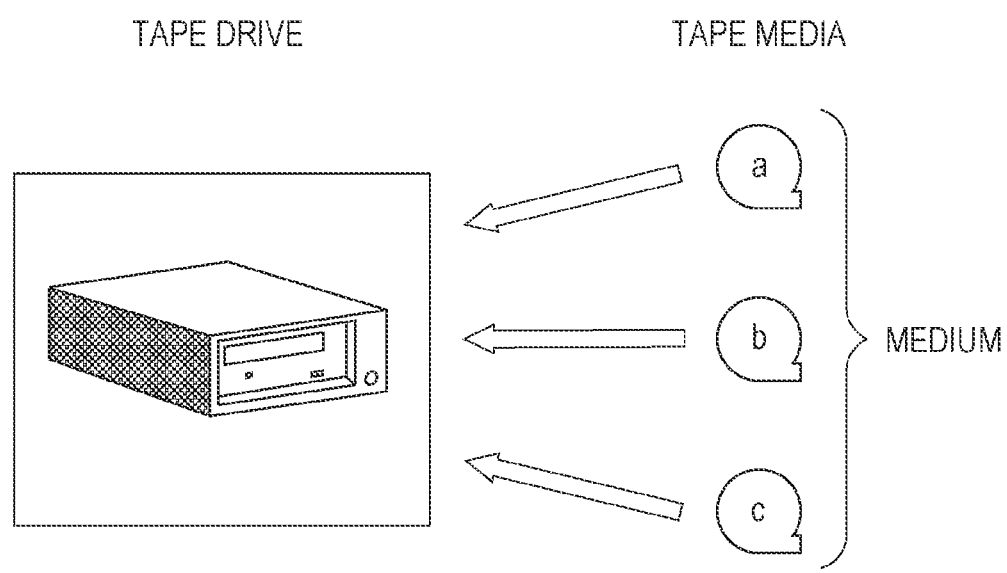
FIG. 1 illustrates an example in which a single file is split and stored into a plurality of media, i.e., spanned.

FIG. 1 shows an example of a single file that is split and stored into a plurality of media, i.e. a file that is spanned in a known LTFS. FIG. 1 shows an example in which a plurality of media are loaded/unloaded to a single drive. Typically, a storage system includes one or more tape drives and a plurality of media that use a plurality of drives. Signs "a," "b," and "c" are the IDs of media indicating the indices of the media. A storage system, such as a tape library, identifies a target medium by using the ID. Suppose a case in which one drive is available for spanning and the other drives are used for other applications. The first medium "a" is loaded (mounted) on one drive, and the beginning of a file (the first file portion) is written thereto. This drive stores the metadata of the file of the medium "a" as an index. Next, the medium "a" is unloaded (unmounted), and the next medium "b" is loaded on the same drive, and the next file portion is written thereto. This drive stores the metadata of the file of the medium "b" as an index. Next, the medium "b" is unloaded, the next file portion is loaded on the same drive, and the next file portion is written thereto. This drive stores the metadata of the file of the medium "c" as an index.

Thus, the spanning of the single file is completed. Since the known LTFS does not assume that the file is written to a plurality of media at the start of writing, the individual media store the individual file portions independently. The IDs of the individual media in each of which a portion of the file is stored are managed only by an application of the host computing system. The media each store a medium ID of itself and a portion of the file as an index and are not associated with the other media that store the other portions.

FIG. 2 shows methods for registering the metadata of the individual media in an index partition when spanning a file across a plurality of media. FIG. 2 shows a form in which a single file is split into, for example, three file portions, and they are written to three different media. Part (a) of FIG. 2 shows a known spanning method for writing a single file across a plurality of media. The individual media register the IDs ("a," "b," and "c") of themselves and the IDs ("b1," "b2," and "b3") of file portions (portion 1, portion 2, and portion 3) in an IP as an index. The known LTFS merely assigns the IDs of media and the IDs of file portions stored in the media.

Part (b) of FIG. 2 shows a spanning method of one illustrative embodiment of the present invention for writing a single file across a plurality of media. In writing a file, in addition to the IDs of media, file IDs (UUIDs) and generation numbers (indicating the numbers of changing the index) are also written to the index. Suppose that an application 30 of a host computing system 300 (FIG. 5) loads all the media "a," "b," and "c" in sequence and maps the metadata of the file portions 1, 2, and 3 on the host computing system (or simply "host") 300, or a memory of a storage system 100, from all the indices. With the illustrative embodiment, the application 30 can obtain the indices of the individual media "a," "b," and "c" by designating a path including the beginning of the file F1 and following the medium "a" to the following media "b" and "c" at the time the file F1 is opened.

For example, the medium "b" stores, in addition to the medium ID "b" of itself, the ID "a" of the media "a" that stores the file portion 1 preceding the file portion 2 that the medium "b" stores and the ID "c" of the media "c" that stores the file portion 3 following the file portion 2.

The file F1 that the application 30 manages is registered as an ID in the tape library. That is, portions of a single file are stored in a plurality of media. The portion 1, portion 2, and portion 3 are file portion IDs that are discriminated from the IDs that the individual media manage therein.

A value, i.e. the generation number, that increases by 1, is assigned to the media "a," "b," and "c" every time there is an increase in a number of media that store a file portion of the file. Values 2, 3 and so on are assigned, from the generation 1 of the medium "a" for the file portion 1, every time a medium increases, such as the medium "b" and the medium "c." In the case where writing to change the portion 2 stored in the medium "b" is performed, the largest value (3 of the medium "c") of the generation numbers of all the file portions (portions 1, 2, and 3) of the file F1 is obtained, and a value larger than this value by one is stored as a generation number in the index of the medium "b," e.g., a generation number of "4" in this example.

FIG. 3 shows the contents of an index partition and a data partition of a medium in an LTFS format. The LTFS needs to initialize tape media in advance in the LTFS format when reading and writing files on the tape media. When using tape media in the LTFS, the tape media are split into two partitions called an index partition (IP) and a data partition (DP). When a user writes to a tape medium using the LTFS, metadata called an index file (also simply referred to as an index) is written to the tape medium in addition to a file main body. The index has information, such as a file name and a file creation date. Mainly the latest index is written to the IP. The main body of the file and the history of the index are written to the DP.

FIG. 3 shows that a tape cartridge medium is divided into the index partition and the data partition. This diagram shows an example of the configuration of a medium conforming to LTO-5. In this example, the tape is divided into the IP and the DP from the beginning of the tape (BOT) across the end of the tape (EOT). The medium is divided into the index partition at the beginning and the data partition that makes up most of a tape storage area along a data recording track. The number of partitions can be changed to any number equal to or larger than three depending on the specifications.

Part (A) of FIG. 3 shows information written to the tape medium immediately after it is initialized in the LTFS format. Immediately after the tape medium is initialized in the LTFS format, the following information, also shown in part (A) of FIG. 3, is written to the tape medium:

Format Identification Data set (FID) is special data written to the beginning of a tape medium, when a tape drive initializes the tape medium, and has information such as the number of partitions on the tape medium and the capacities of the individual partitions;

VOL 1 Label, also referred to as an ANSI Label, is a label in a general format defined literally by American National Standards Institute (ANSI);

LTFS Label is a label defined in the LTFS format, which holds information on what version of the LTFS format the formatting of the tape medium conforms to. This indicates the size of a record to be recorded on the medium. Even if the trailing edge of the file does not satisfy the record size (for example, 512 KB), the record size is ensured; and Filemark (FM) is, like a bookmark, generally used in tape media to find the beginning of data (seeking). Index #0 is an index written during formatting, which is written to hold information, such as the volume name of the tape medium, although no file-unique information is present because there is no file at this stage.

Part (B) of FIG. 3 shows information written to the tape medium in the case where a file is written after being initialized in the LTFS format. When a file (File 1) is written after being initialized in the LTFS format, the data written on the tape medium becomes that shown in part (B) of FIG. 3. The portions enclosed by the bold lines are added/updated data. Index #1 has information on File 1. The IP holds only the latest index, while the DP holds the history of the index. The timing at which the index is updated depends of the implementation of the file system. For example, the index may be updated at certain intervals or only when the tape medium is taken out of the tape drive. Also when the tape medium is continuously used, the index placed on the IP is always the latest index, and files and indices are added to the DP without updating the present index.

Part (C) of FIG. 3 shows information written to the tape medium in the case where a file (File 2) is written after the state of (B). After a directory is written to the tape medium, another file or directory is written to the tape medium, and thereafter a file is added to the first written directory, File 1 and File 2 are stored in the tape medium in sequence.

Figure 4:
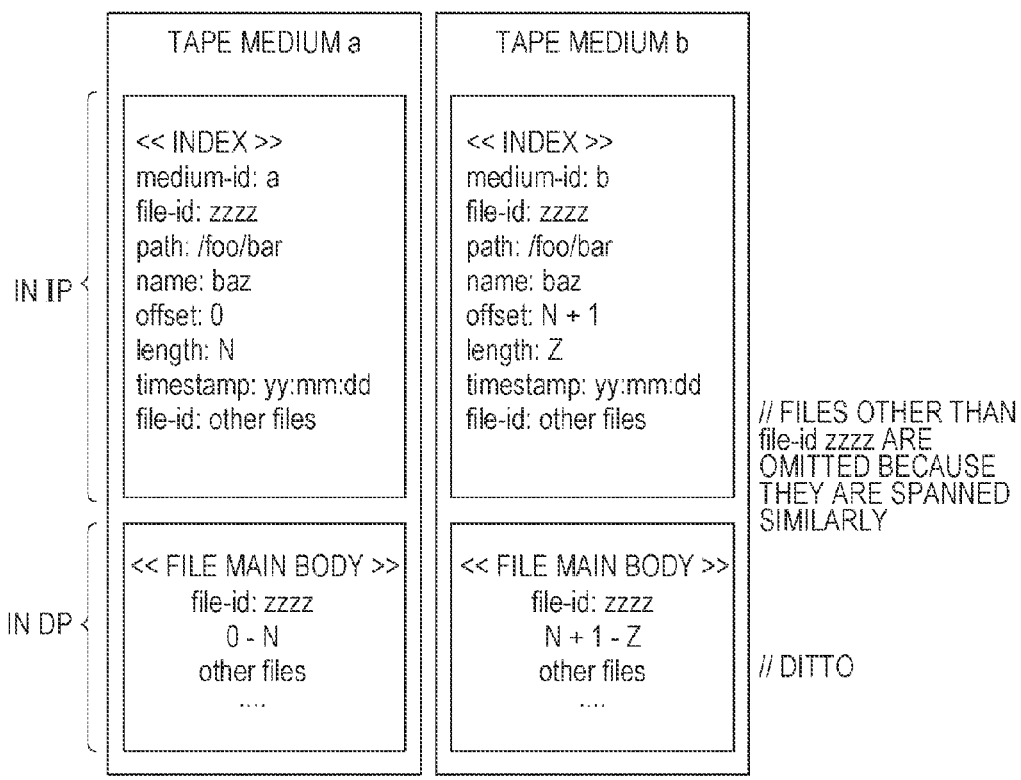
FIG. 4 illustrates an example of the indices of the index partitions of two cartridge media in a known LTFS format.

FIG. 4 shows the indices (metadata) of the IPs of two cartridge media in a known LTFS format. In the known LTFS format, the tape media each has an index and a file main body when a file having an ID zzzz (file-id=zzzz) is subjected to spanning. This conforms to the principle of the LTFS format that information on the file main body recorded on the tape medium storing the index is stored. The index in the IP includes an ID (media-id: UUID), the ID of a file in the medium (file-id), a path and a file name (path, name), a file offset position (offset), a file size (length), a time stamp (timestamp), and the IDs of the other files included in the medium (file-id: other files). In the present invention, the IDs of the other media, the ID of a single file F1 that the application 30 manages, and the generation number, described above, are also registered in the index. The registration of these elements facilitates management of spanning of the file F1 using the index of the medium if management at the host 300 is hindered. Furthermore, the contents of the file F1 can be stored in the DP together with its index.

Figure 5:
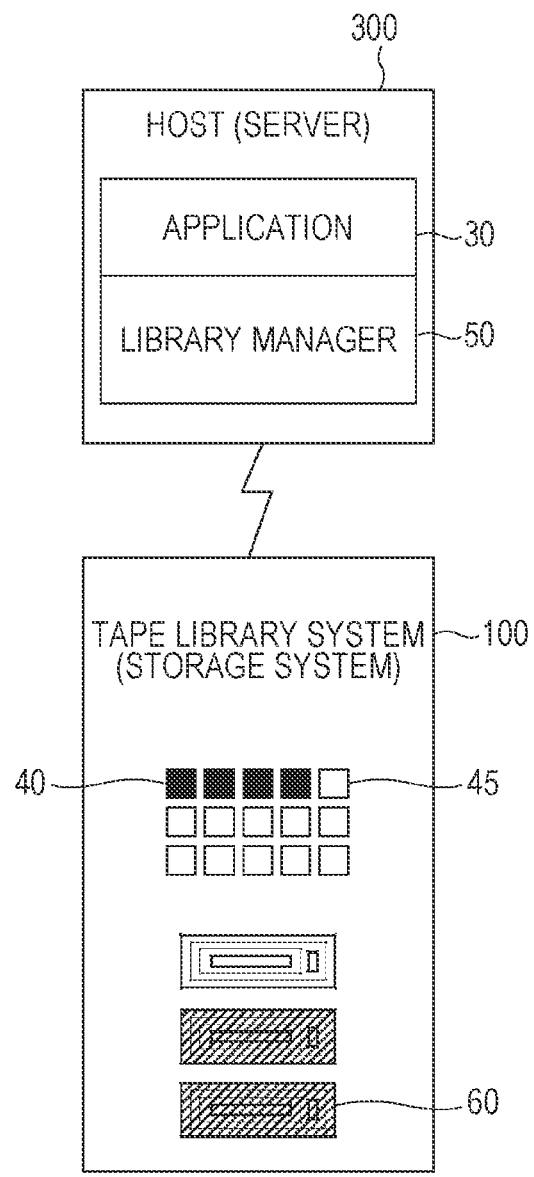
FIG. 5 illustrates an example of the configuration of a tape library system including a plurality of tape drives to which an illustrative embodiment of the present invention is applied.

FIG. 5 shows an example of the configuration of a tape library system including a plurality of tape drives to which an illustrative embodiment of the present invention is applied. The storage system 100 includes three tape drives 60, tape cartridges (media) 40, and slots 45 for housing the tape cartridges 40. The storage system 100 accommodates many tape cartridges 40 housed in the slots 45.

A library manager 50 is provided between the host 300 and the storage system 100 to centrally manage the plurality of tape drives 60 and the plurality of tape cartridges 40. The library manager 50 virtualizes the plurality of tape cartridges 40 and tape drives 60 to control reading and writing. An example of the library manager 50, provided by International Business Machines (IBM) Corporation of Armonk, N.Y., is IBM's Tape System Library Manager (TSLM). The application 30 in the host 300 issues a request to read and write a file to the storage system 100 via the library manager 50. The storage system 100 is controlled by various commands (reading/writing, positioning, and so on) that the application 30 issues. The library manager 50 temporarily stores a command from the application 30 and outputs a small computer system interface (SCSI) command or the like corresponding to the command to the storage system 100. An example of an application serving as dedicated software is Tivoli Storage Manager available from IBM Corporation.

The library manager 50 receives a command to request loading from the application 30. During the execution of the command, the library manager 50 generally searches the plurality of (three) drives 60 for an empty drive 60. The tape cartridge 40 to be loaded is mounted in the loadable empty drive 60. If the three drives 60 are in use, the library manager 50 is kept waiting until any of the drives 60 becomes available. The tape library system 100 can also be used in a file system as in a HDD and so on. For example, the LTFS allows data written on a medium to be viewed as a file.

The tape drive 60 writes/reads a plurality of items of data sent from the host 300 to/from a tape recording medium in units of a fixed-length data set (DS). One example volume of the DS is 4 MB. The application 30 in the host 300 sends a write/read request to the tape drive 60 via a file system in the units of 128 KB. If the SCSI is used as a communication standard, the application 30 issues a request to write/read data (Write/Read) to the tape drive 60. The tape drive 60 writes/reads data in units of a DS constituted by a plurality of blocks.

The tape drive 60 writes/reads data to/from tape in response to a command received from the host 300. The tape drive 60 includes a buffer, a read/write channel, a head, a motor, a reel around which a tape medium (a medium or tape) is wound, a read/write control system, a head-position control system, and a motor driver. The tape drive 60 mounts the tape cartridge 40 in a removable manner. The tape moves in the longitudinal direction as the reel rotates. The head writes or reads data to/from the tape as the tape moves in the longitudinal direction. The tape cartridge 40 includes a non-contact non-volatile memory called a cartridge memory (CM). The CM mounted in the tape cartridge 40 is read/written by the tape drive 60 in a non-contact manner. The CM stores a cartridge attribute. The tape drive 60 extracts the cartridge attribute from the CM during reading/writing to allow optimum reading/writing.

Figure 6:
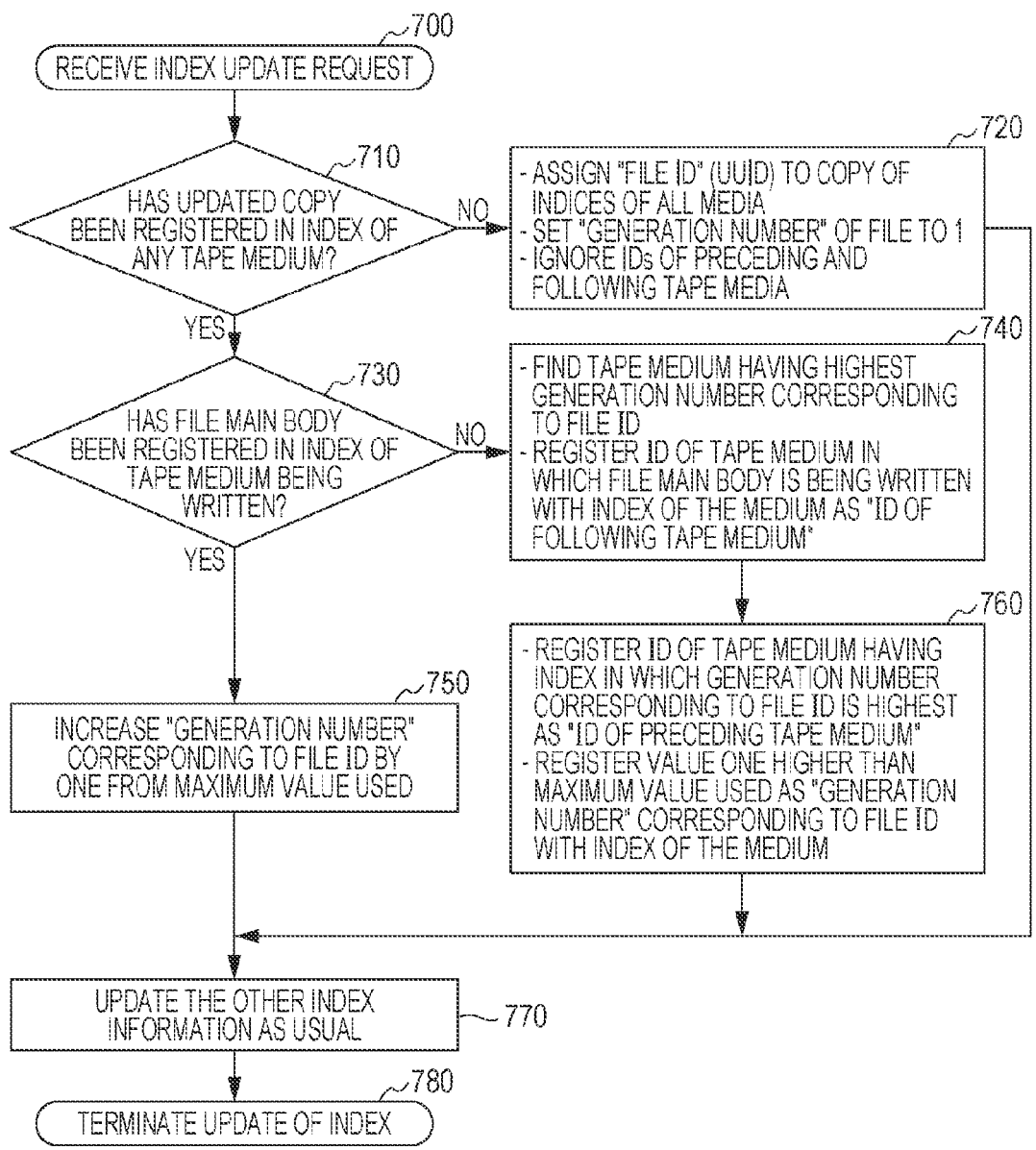
FIG. 6 is a flowchart for updating an index in an expanded LTFS format in accordance with one illustrative embodiment of the present invention.

FIG. 6 is a flowchart for updating an index in the expanded LTFS format of one illustrative embodiment of the present invention. The following process is implemented in a new file system, for example, the LTFS.

Assume that the application 30 in the host 300 (FIG. 5) loads all the media "a," "b," and "c" in sequence and maps the metadata (index) of the file portions 1, 2, and 3 from all the indices into the host 300 or a memory of the tape library system 100. The application 30 can obtain the indices of the individual media at the time when the file is opened by designating a path including the medium "a" and following the medium "a" and then following media "b" and "c" in sequence. Now, with reference to FIG. 6:

(700): Receive an index update request.

In part (b) of FIG. 2, when a specific portion (for example, b) of the file F1 is changed, the changed data is stored in the DP of the medium "b." With this change, a copy of the index of the medium "b" is changed in the memory of the tape library system 100 or the hard disk drive. For example, the generation number indicating the changing of the index for the file is increased by one from the present maximum value 3 of the portion 3 and is updated to 4. However, a copy of the updated index has not been registered in the IP of the medium "b." Although the tape library system 100 updates the content of data in the DP of the medium "b," registration of a copy reflecting the content of the data to the IP of the medium "b" is delayed. To minimize the time-lag, the tape library system 100 registers the latest index at predetermined intervals, for example, every five minutes. The latest index is registered in the IP also when the medium is unmounted from the drive 60.

(710): Determine whether the content of the updated copy on the memory has been registered in the index of any tape medium.

If the updated copy in the memory of the tape library system 100 has been registered in the index of the tape medium loaded on the drive 60 (Yes), the process moves to step 730. If the updated copy has not been registered in the index of the target tape medium (No), the process moves to step 720.

(720): Referring to part (b) of FIG. 2 as an example, suppose that the plurality of portions b1, b2, and b3 of the file F1 are spanned in sequence across the mediums "a," "b," and "c." To allow the file F1 that the application 30 (FIG. 5) manages to be uniquely indexed, the ID (F1: UUID) is assigned to copies of the indices of all the media "a" to "c." To store the first portion 1 (b1) of the file F1 in the first medium "a," the generation number of the first portion 1 is set to 1. The IDs of the preceding and following tape media are ignored. Whether data on the following portions 2 (b2) and 3 (b3) of the file F1, having capacities exceeding the capacity of the medium "a," is or will be stored is uncertain at the start of the storage of the first portion 1 (b1). Accordingly, the ID "b" of the following medium "b" cannot be expected at the start of the storage of the portion 1 (b1) (step 740). However, the medium "a" is assigned generation number 1. Lastly, the process moves to step 770 to process the other index information.

(730): Determine whether the file main body has been registered in the index on a tape medium being written. If the details of the change in the file F1 are stored in the tape media "b" and "c," and a copy of the index reflecting the change is registered in the IPs of the series of media "b" and "c" (Yes), the process moves to step 750. If a copy of the changed index is not registered in the tape media "b" and "c" (No), the process moves to step 740.

When an index related to the portion 2 is to be first registered in the medium "b," it is necessary to register the presence of the portion 2 with the index of the portion 1 on the medium "a." For the example case in which the update and registration of the index is performed at a predetermined interval, such as every five minutes, if information on the portion 2 is present in the medium "b," the registration of the presence of the portion 2 on the medium "b" with the index of the portion 1 on the medium "a" can be omitted.

(740): As shown in part (b) of FIG. 2, assume the process of spanning the three portions 1 (b1), 2 (b2), and 3 (b3) of the file F1 across three media "a" to "c." Step 740 comprises finding a tape medium whose generation number corresponding to the file ID that is the highest. The generation number in the case where the first portion 1 (b1) is stored in the medium "a" has the maximum value 1 assigned in step 720. The index of the medium "a" having the highest generation number has the updated index of the latest file. The operation of step 740 further comprises registering the ID of the following tape medium to which the file main body is being written with the index of the tape medium. The ID "b" of the following medium "b" to which the following portion 2 is to be stored is registered in the medium "a." When the portion 2 (b2) is stored, a generation number 2 increased by one from the generation number 1 of the medium "a" is registered in the medium "b." Lastly, the process moves to step 760.

(750): Increase the generation number corresponding to the file ID by one from the maximum value used. Assume a change in the file F1 (addition of data, partial deletion of data, change in file name, or the like) is made for one of the plurality of portions 1, 2, and 3. In the spanning state shown in part (b) of FIG. 2, the generation number of the medium "c" is the maximum value 3. For example, a copy of an index reflecting the details of the change in the portion 2 (b2), stored in the medium "b," is registered in the IP of the medium "b," a value "4," increased by one from the value of the generation number that the medium "c" stores, is given as the generation number of the medium "b." Lastly, the process moves to step 770 to process the other index information.

(760) As part of the operation of step 760, the ID of the preceding tape medium, having an index in which the generation number corresponding to the file ID is the highest is registered with the index of the tape medium to which the file main body is being written. A value, one larger than the maximum value used with the index of the medium, is registered as a generation number corresponding to the file ID. The ID "a" of the preceding medium "a" that stores the portion 1 (b1) having the highest generation number is registered in the medium "b." When the portion 2 (b2) is stored, the generation number of the medium "b" is increased by one from the highest generation number 1 of the medium "a" into the highest generation number 2. Furthermore, the following portion 3 (b3) is stored in the medium "c," and the generation number thereof is increased by one from the generation number 2 of the medium "b" into a generation number 3. The medium "b" also has a medium ID "c" in which the following portion 3 is to be stored (step 730). The ID "c" of the medium "c" to which the following portion 3 (b3) is to be stored is registered in the medium "b" having the highest generation number 2. Finally, the medium "c" has the highest generation number 3 increased by one from the generation number 2 of the medium "b." Lastly, the process moves to step 770 to process the other index information.

(770): Update the other index information as usual. The three new elements that the present invention provides are included in the index together with the other index elements (see FIG. 4), for example, the ID of the medium, file-id in the medium, time stamp, and file size.

(780): The update of the index including these other elements and the three elements according to illustrative embodiments of the present invention ends. The index in the IP of a medium mounted in the drive 60 is rewritten to the index updated in the tape library system 100 or the memory of the drive 60. The tape library system 100 can specify a time stamp and size included in the index of a single medium using the highest generation number with a change in the file portion itself.

Since the index information is stored/managed in the memory or the hard disk drive by the LTFS, there is generally no need to read the index from the tape medium in the future. For example, it is advantageous to ensure additional elements when a copy of an index that the LTFS stores in a memory or the like is lost due to a trouble condition of the memory or the hard disk drive and thus, the index needs to be read from the tape medium. Collecting the indices of all tape media in the tape library and adopting information on individual files each having the highest generation number allows information on the file size, time stamp, etc. to be obtained. Furthermore, by following the IDs of the preceding and following tape media registered therein, the system can be informed where and which of the tape media the portions of the files split and stored in the individual tape media are stored.

Thus, the spanning method according to an embodiment of the present invention allows the LTFS to obtain the latest information from a single tape medium without updating the indices of the tape media when creating/updating the spanned file. The method of the present invention reduces the time required for unloading/loading involved in writing, thus enhancing the index update performance. Although the present invention has been described based on an embodiment, the scope of the present invention is not limited to the embodiment. It is apparent to those skilled in the art that various changes and modifications can be adopted without departing from the spirit and scope of the present inventions.

What is claimed is:

1. A method for spanning a single file across a plurality of tape media in a tape storage system including at least one tape drive, the method comprising:
    formatting the tape media so as to store an index of the file and data of the file in the tape media in a predetermined format;
    splitting the single file into separate file portions and managing identifiers (IDs) identifying the plurality of tape media that sequentially store the file portions in association with the file; and
    for each tape medium storing a file portion of the file, storing a generation number indicating a sequential number value corresponding to the file portion stored on the tape medium and updating the file portion stored on the tape medium, as part of the index, with the generation number corresponding to the file portion stored on the tape medium; and
    in response to receiving a request to read the file from the tape storage system:
        obtaining, by the tape storage system, an index on a tape medium storing a file portion whose corresponding generation number is the highest of the generation numbers of the separate file portions; and
        reading, by the tape storage system, the obtained index of the file.

2. The spanning method according to claim 1, wherein in the predetermined format, the tape media are each divided into two or more partitions to allow the file system to read and write for sequential access of the storage system and the partitions include an index partition (IP) storing the index of the file and a data partition (DP) storing data on the file.

3. The spanning method according to claim 1, wherein the generation number is increased from a current value to a next value each time a new file portion is stored in another tape medium in the plurality of tape media and is also increased from the current value to the next value in response to a file portion of the file being modified on a tape medium in the plurality of tape media.

4. The spanning method according to claim 1, wherein when a file portion is changed, a current largest value of the generation number is updated by increasing the current largest value by one and the updated current largest value is stored in the tape medium storing the file portion that was changed.

5. The spanning method according to claim 1, wherein an ID identifying the file is stored as part of the index in each of the tape media that store the file portions.

6. The spanning method according to claim 1, wherein each of the tape media that store the file portions each store, as part of the index stored on the tape medium, at least one of the IDs identifying the plurality of tape media that store other file portions of the file.

7. The spanning method according to claim 1, wherein a tape medium storing a first file portion further stores, as part of the index, an ID of a tape medium that stores a file portion preceding the first file portion and an ID of a tape medium that stores a file portion following the first file portion.

8. The spanning method according to claim 2, wherein in response to the tape storage system receiving a request to update a file portion, the tape storage system:
    identifies an ID of a tape medium storing the file portion to be updated and mounts the tape medium in a drive;
    stores the index on the tape medium having the ID into a memory of the tape storage system;
    updates the data in the DP of the tape medium in an updated file portion;
    updates the index stored in the memory as the data in the DP changes so as to reflect the updated file portion;
    stores, in the updated index in the memory, an updated generation number of the file portion corresponding to the updated file portion; and
    registers the updated index in the IP of the tape medium at a predetermined time.

9. A tape storage system for spanning a single file across a plurality of tape media, the tape storage system comprising:
    at least one tape drive; and
    a controller coupled to the at least one tape driver, wherein the controller is configured with logic that:
    formats the tape media so as to store an index of the file and data of the file in the tape media in a predetermined format;
    splits the single file into separate file portions and managing identifiers (IDs) identifying the plurality of tape media that sequentially store the file portions in association with the file;
    for each tape medium storing a file portion of the file, stores a generation number indicating a sequential number value corresponding to the file portion stored on the tape medium and updating the file portion stored on the tape medium, as part of the index, with the generation number corresponding to the file portion stored on the tape medium; and
    in response to receiving a request to read the file from the tape storage system:
        obtaining, by the tape storage system, an index on a tape medium storing a file portion whose corresponding generation number is the highest of the generation numbers of the separate file portions; and
        reading, by the tape storage system, the obtained index of the file.

10. The tape storage system according to claim 9, wherein in the predetermined format, the tape media are each divided into two or more partitions to allow the file system to read and write for sequential access of the storage system and the partitions include an index partition (IP) storing the index of the file and a data partition (DP) storing data on the file.

11. The tape storage system according to claim 9, wherein the generation number is increased from a current value to a next value each time a new file portion is stored in another tape medium in the plurality of tape media and is also increased from the current value to the next value in response to a file portion of the file being modified on a tape medium in the plurality of tape media.

12. The tape storage system according to claim 9, wherein when a file portion is changed, a current largest value of the generation number is updated by increasing the current largest value by one and the updated current largest value is stored in the tape medium storing the file portion that was changed.

13. The tape storage system according to claim 9, wherein an ID identifying the file is stored as part of the index in each of the tape media that store the file portions.

14. The tape storage system according to claim 9, wherein each of the tape media that store the file portions each store, as part of the index stored on the tape medium, at least one of the IDs identifying the plurality of tape media that store other file portions of the file.

15. The tape storage system according to claim 9, wherein a tape medium storing a first file portion further stores, as part of the index, an ID of a tape medium that stores a file portion preceding the first file portion and an ID of a tape medium that stores a file portion following the first file portion.

16. The tape storage system according to claim 10, wherein in response to the tape storage system receiving a request to update a file portion, the tape storage system:
- identifies an ID of a tape medium storing the file portion to be updated and mounts the tape medium in a drive;
- stores the index on the tape medium having the ID into a memory of the tape storage system;
- updates the data in the DP of the tape medium in an updated file portion;
- updates the index stored in the memory as the data in the DP changes so as to reflect the updated file portion;
- stores, in the updated index in the memory, an updated generation number of the file portion corresponding to the updated file portion; and
- registers the updated index in the IP of the tape medium at a predetermined time.

17. A computer program product comprising a non-transitory computer readable medium comprising instructions for spanning a single file across a plurality of tape media in a tape storage system including at least one tape drive, the computer program product causing the tape storage system to:
- format the tape media so as to store an index of the file and data of the file in the tape media in a predetermined format;
- split the single file into separate file portions and managing identifiers (IDs) identifying the plurality of tape media that sequentially store the file portions in association with the file; and
- for each tape medium storing a file portion of the file, store a generation number indicating a sequential number value corresponding to the file portion stored on the tape medium and updating the file portion stored on the tape medium, as part of the index, with the generation number corresponding to the file portion stored on the tape medium, wherein the computer program product further causes the tape storage system, in response to receiving a request to read the file from the tape storage system, to obtain an index on a tape medium storing a file portion whose corresponding generation number is the highest of the generation numbers of the separate file portions and read the obtained index of the file.

18. The computer program product according to claim 17, wherein in response to the tape storage system receiving a request to update a file portion, the computer program product further causes the tape storage system to:
- identify an ID of a tape medium storing the file portion to be updated and mounts the tape medium in a drive;
- store the index on the tape medium having the ID into a memory of the tape storage system;
- update the data in the DP of the tape medium in an updated file portion;
- update the index stored in the memory as the data in the DP changes so as to reflect the updated file portion;
- store, in the updated index in the memory, an updated generation number of the file portion corresponding to the updated file portion; and
- register the updated index in the IP of the tape medium at a predetermined time.

* * * * *